J. H. WOODRING.
SHOCK ABSORBER.
APPLICATION FILED AUG. 29, 1911.
1,022,015.
Patented Apr. 2, 1912.
2 SHEETS—SHEET 2.
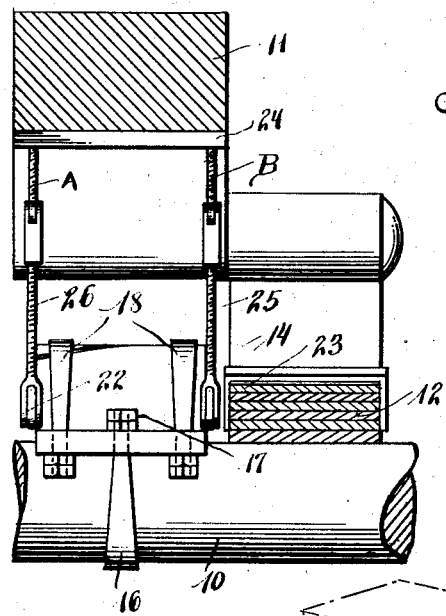
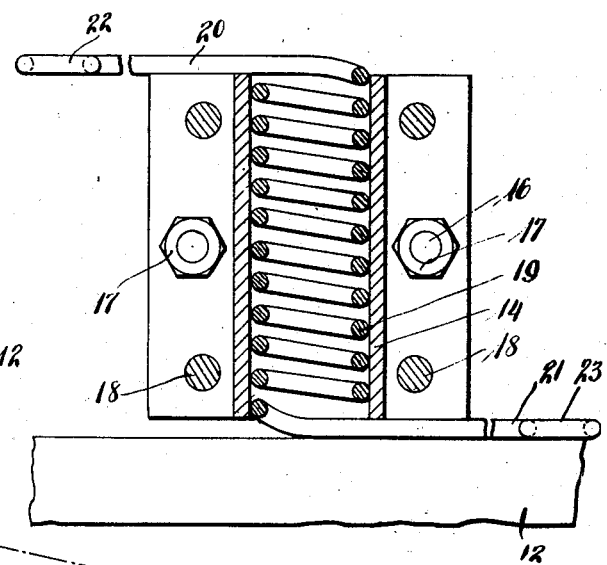
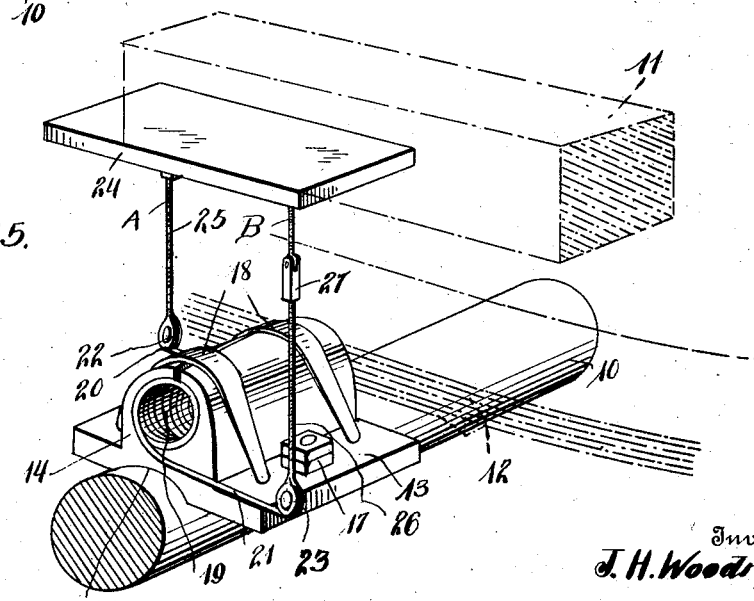
Inventor
J. H. Woodring
Witnesses

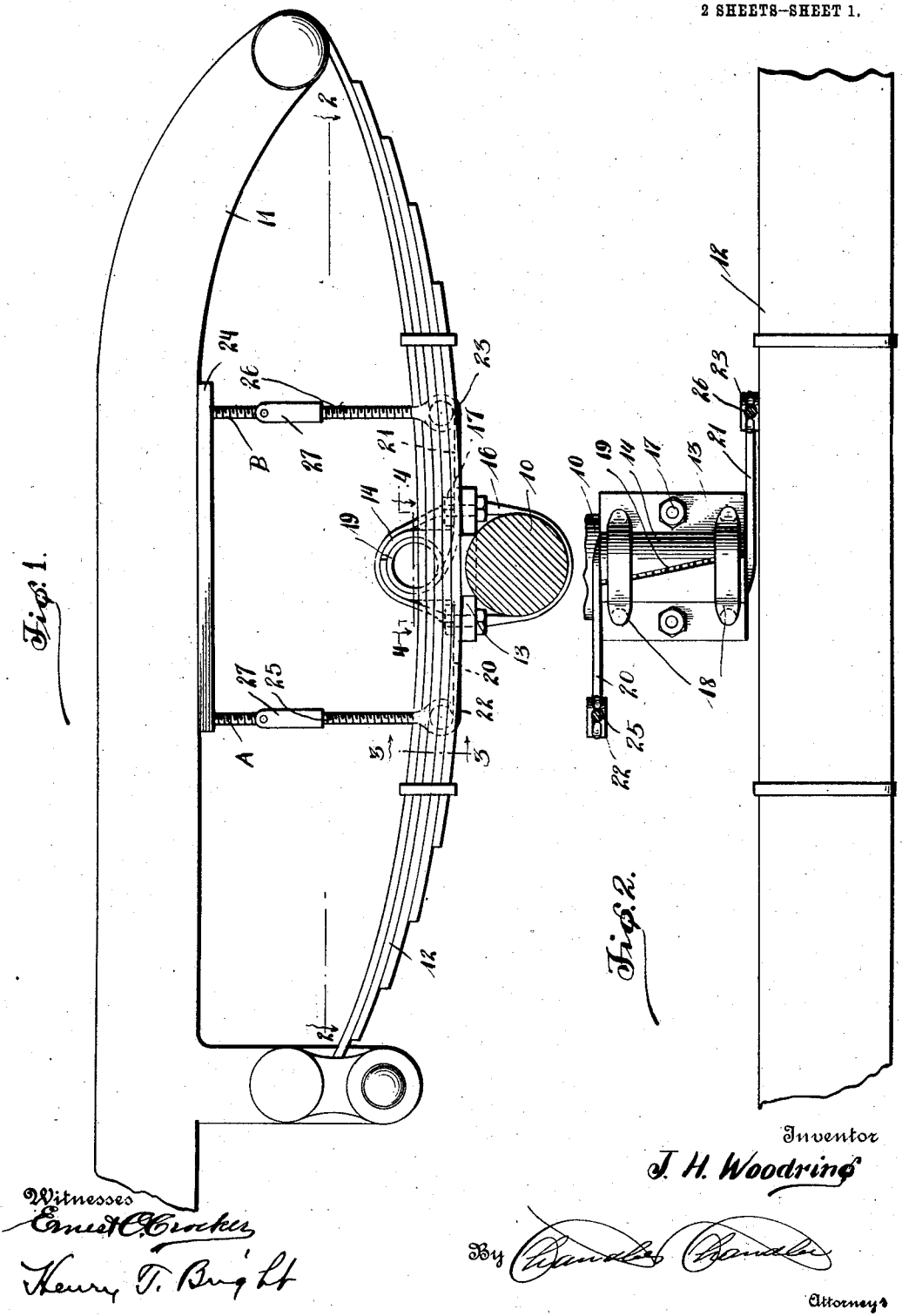

UNITED STATES PATENT OFFICE.

JAMES H. WOODRING, OF CORRY, PENNSYLVANIA.

SHOCK-ABSORBER.

1,022,015.  Specification of Letters Patent.  Patented Apr. 2, 1912.

Application filed August 29, 1911. Serial No. 646,587.

*To all whom it may concern:*

Be it known that I, JAMES H. WOODRING, a citizen of the United States, residing at Corry, in the county of Erie, State of Pennsylvania, have invented certain new and useful Improvements in Shock-Absorbers; and I do hereby declare the following to be a full, clear, and exact description of the invention, such as will enable others skilled in the art to which it appertains to make and use the same.

This invention relates to shock absorbers.

The object of the invention resides in the construction of a simple, strong and durable device of the character named, which may be easily applied to automobiles and other vehicles and when so applied will efficiently absorb the shocks due to the vehicle passing over the rises and depressions of an irregularly surfaced road.

With the above and other objects in view, the invention consists in the details of construction and in the arrangement and combination of parts to be hereinafter more fully described and particularly pointed out in the appended claims.

In describing the invention in detail, reference will be had to the accompanying drawings, wherein like characters of reference denote corresponding parts in the several views, and in which—

Figure 1 is a side elevation of a shock absorber constructed in accordance with the invention, same being shown associated with an automobile and in operative position on the rear axle thereof, Fig. 2, a section on the line 2—2 of Fig. 1, Fig. 3, a view in elevation looking at the forward end of what is shown in Fig. 1, Fig. 4, an enlarged section on the line 4—4 of Fig. 1, and Fig. 5 a detail perspective view showing the absorber applied to the rear axle of an automobile, with certain parts of the automobile in dotted lines to better show the shock absorber.

Referring to the drawings, 10 indicates the rear axle of an automobile, 11 the frame and 12 the usual spring which yieldingly supports the frame upon the axle.

The shock absorber is shown as comprising a base plate 13 from which rises a centrally disposed tubular extension 14. The lower side of the plate is provided with a central groove 15 in which the axle 10 seats when the shock absorber is secured in place. The plate 13 is secured to the axle 10 by a clip 16 which surrounds the axle and has its terminals threaded and extending through the base plate 13 at opposite sides and centrally of said base plate. Nuts 17 mounted on the threaded ends of the clip 16 serve to bind the latter upon the axle 10 and efficiently secure the base plate and the tubular extension thereof to said axle. The extension 14 is strengthened by clips 18 which surround said extension and have their ends secured to the base plate 13 in a manner similar to the clip 16. Mounted in the bore of the extension 14 is a coil spring 19 the ends of which are disposed without said bore and directed transversely of the axle 10 to form arms 20 and 21, the free ends of which terminate in loops 22 and 23 respectively. Secured to the lower side of the frame member 11 is a plate 24, said plate being positioned directly above the base plate 13 and the extension 14. Depending from opposite ends of the plate 24 are arms A and B, the lower ends of which are pivotally engaged respectively in the loops 22 and 23.

Each of the arms A and B is formed of the upper terminal section 25, a lower terminal section 26, and an intermediate section 27. The upper end of the upper terminal section 25 of each arm A and B is screwed into the plate 24 while the lower end thereof is pivotally connected to the upper end of the intermediate section 27. The lower end of the lower terminal section of the arm A is pivotally connected to the loop 22, while the lower end of the lower terminal section of the arm B is pivotally connected to the loop 23. The upper end of the lower terminal section of each arm A and B is screwed into respective intermediate sections 27. By this construction it will be apparent that the connection between the shock absorber and the automobile will permit the latter to sway freely.

By this construction it will be apparent that when the automobile is subjected to undue shock during travel, the frame 11 will move downwardly toward the axle 10 and this movement, as a result of the connecting arms 25 and 26, will cause the spring 19 to tension and absorb the shock before the ultimate effect thereof is transmitted to the occupants of the vehicle.

What is claimed is:

1. In a shock absorber for vehicles, the combination of a vehicle axle and frame, a tubular member secured to the axle and having its bore disposed longitudinally of the latter, a coil spring mounted in the bore of said member and having its ends extended in opposite directions to form arms disposed transversely of the axle, and connections between the vehicle frame and the ends of said arms, whereby relative movement of the frame with respect to the axle will be resisted by said spring.

2. In a shock absorber for vehicles, the combination of a vehicle axle and frame, a tubular member secured to the axle and having its bore disposed longitudinally of the latter, a coil spring mounted in the bore of said member and having its ends extended in opposite directions to form arms disposed transversely of the axle, and rods depending from the frame of the vehicle and secured at their lower ends to respective ends of the arms of the spring whereby relative movement of the frame with respect to the axle will be resisted by said spring.

In testimony whereof, I affix my signature, in presence of two witnesses.

JAMES H. WOODRING.

Witnesses:
WILLIAM E. HALL,
CASSIUS L. ALEXANDER.

Copies of this patent may be obtained for five cents each, by addressing the "Commissioner of Patents, Washington, D. C."